United States Patent
Thomas et al.

(10) Patent No.: US 7,449,049 B2
(45) Date of Patent: Nov. 11, 2008

(54) METHOD OF PURIFYING A NATURAL GAS BY MERCAPTAN ADSORPTION

(75) Inventors: Michel Thomas, Lyons (FR); Eszter Toth, Lyons (FR); Fabrice Lecomte, Paris (FR); Peter Meyer, Paris (FR); Jean-Louis Ambrosino, Ternay (FR)

(73) Assignee: Institute Francais du Petrole, Malmaison Cedex (FR)

( * ) Notice: Subject to any disclaimer, the term of this patent is extended or adjusted under 35 U.S.C. 154(b) by 440 days.

(21) Appl. No.: 11/366,581

(22) Filed: Mar. 3, 2006

(65) Prior Publication Data

US 2006/0204419 A1    Sep. 14, 2006

(30) Foreign Application Priority Data

Mar. 8, 2005    (FR)    .................................. 05 02316

(51) Int. Cl.
*B01D 53/04*    (2006.01)
*B01D 53/48*    (2006.01)
*C07C 7/13*    (2006.01)

(52) U.S. Cl. ............................ 95/123; 95/135; 95/236; 423/244.01; 585/822; 585/826

(58) Field of Classification Search ............. 95/95–106, 95/114, 115, 117, 121–123, 135, 143, 235, 95/236; 423/220–229, 244.01; 585/820, 585/822, 826; 208/208 R, 213, 189

See application file for complete search history.

(56) References Cited

U.S. PATENT DOCUMENTS

| | | | |
|---|---|---|---|
| 3,306,841 A | 2/1967 | Ward | |
| 3,660,967 A | 5/1972 | Collins et al. | |
| 4,830,734 A * | 5/1989 | Nagji et al. | 208/208 R |
| 4,957,715 A * | 9/1990 | Grover et al. | 423/228 |
| 5,424,051 A * | 6/1995 | Nagji et al. | 423/234 |
| 5,659,109 A * | 8/1997 | Fernandez de la Vega et al. | 585/834 |
| 7,192,565 B2 * | 3/2007 | Briot et al. | 423/242.2 |
| 7,211,128 B2 * | 5/2007 | Thomas et al. | 95/135 |
| 7,311,758 B2 * | 12/2007 | Thomas et al. | 95/122 |

FOREIGN PATENT DOCUMENTS

| | | |
|---|---|---|
| FR | 1282754 | 12/1960 |
| FR | 2868962 | 10/2005 |
| GR | 1516202 | 4/1974 |
| WO | WO 2004/039926 | 5/2004 |

OTHER PUBLICATIONS

International Search Report, dated Nov. 2005.

* cited by examiner

*Primary Examiner*—Frank M Lawrence
(74) *Attorney, Agent, or Firm*—Antonelli, Terry, Stout & Kraus, LLP.

(57) ABSTRACT

The raw natural gas is deacidized and dehydrated in units DA and DH. The treated gas is then purified by adsorption of the mercaptans in first enclosure A1. Part of the purified gas is heated in E1, then fed into second enclosure A2 so as to discharge the water adsorbed by the adsorbent material contained in this second enclosure. A steam-rich stream is fed into third enclosure A3 containing a mercaptan-laden adsorbent material. In A3, the mercaptans are desorbed and replaced by the steam.

11 Claims, 1 Drawing Sheet

METHOD OF PURIFYING A NATURAL GAS BY MERCAPTAN ADSORPTION

FIELD OF THE INVENTION

The present invention relates to purification of a natural gas. More particularly, the present invention provides a method of purifying a natural gas using absorption in order to reduce the mercaptan content.

A raw natural gas notably contains water, light hydrocarbons such as methane, ethane and propane, heavy hydrocarbons, acid compounds such as carbon dioxide ($CO_2$) and hydrogen sulfide ($H_2S$), and sulfur derivatives such as mercaptans. This raw natural gas has to be treated to meet the various specifications required, notably specifications relative to the acid gas content, the total sulfur content, and the water and hydrocarbon dew points.

BACKGROUND OF THE INVENTION

Raw natural gas can be treated by means of the methods described by documents FR-2,605,241 and FR-2,636,857. These methods use a physical solvent such as methanol for dehydration, gasoline extraction and removal of the acid compounds and of part of the mercaptans. After this treatment, the gas meets the specifications as regards the $CO_2$ content, typically below 2% by mole, and the $H_2S$ content, typically below 4 ppm by mole.

Another gas treatment solution consists in carrying out deacidizing by means of a method using an amine solvent. After this treatment, the gas meets the specifications relative to the $CO_2$ content, typically below 2% by mole, and the $H_2S$ content, typically below 4 ppm by mole, i.e. a total sulfur content of the order of 6 mg S/Nm$^3$. Part of the light mercaptans, notably methylmercaptan, is removed during this stage. On the other hand, the heavier mercaptans, such as ethyl-, propyl- and butyl-mercaptan, are not sufficiently acid to significantly react with the amines and therefore remain in the gas in a large proportion. In some cases, the mercaptan content can reach 500 ppm by mole.

The gas is then dehydrated, for example by means of a method using a solvent such as glycol, for instance the method described by document FR-2,740,468. Dehydration allows the water content of the gas to be lowered to a value close to 60 ppm by mole.

Besides, a TSA (Thermal Swing Adsorption) type absorption method on a molecular sieve, for example of 3A, 4A, 5A or 13X type, or on alumina or silica gel, can be used. In this case, the water content of the gas is typically below 1 ppm by mole.

The aforementioned methods allow to obtain a natural gas whose water, acid compound and heavy hydrocarbon contents meet the commercial requirements. However, the methyl- and ethyl-mercaptans still remain predominantly in the gas, in proportions that can reach 200 ppm by mole or more in sulfur equivalent. For certain uses, these mercaptan proportions are too high.

One object of the present invention is to provide a natural gas purification method in order to obtain a mercaptan molar content below 20 ppm.

It is possible to use a removal method using mercaptan absorption. The conventional gas phase absorption methods are the methods commonly referred to as TSA (Thermal Swing Adsorption) wherein the absorption stage takes place at ambient or moderate temperature typically ranging between 20° C. and 60° C., and the desorption (or regeneration) stage at a high temperature typically ranging between 200° C. and 350° C., in a purge gas sweep stream (in general part of the purified gas containing methane and/or ethane) whose flow rate also ranges between 5% and 20% of the flow of feed gas. The desorption gas containing a large amount of mercaptans then has to be treated prior to being recycled, for example by contacting with a basic solution (soda or potash), or it can be sent to the flare, which is neither economically nor ecologically advantageous. The pressure is either kept substantially constant throughout the cycle, or lowered during the regeneration stage so as to favor regeneration. After this stage of purification by absorption, the water content of the gas is below 1 ppm by mole, and the gas meets the total sulfur specifications.

However, absorption of the mercaptans by means of a conventional TSA method used in the industry, notably to purify a natural gas, has several drawbacks. The following can be mentioned in particular:

- it requires heating to high temperatures, which leads to premature aging of the absorbent material, notably during the desorption of thermally fragile products (under the effect of the thermal treatments regularly applied during the absorbent material regeneration stage, the mercaptans can form reactive compounds and react with the co-absorbed hydrocarbons so as to eventually lead to premature aging of the absorbent material, which may require frequent renewal thereof, and thus involve an additional cost),
- use of a large amount of purge gas, generally ranging between 5% and 20% of the flow of gas to be treated,
- it requires treating the purge gas containing the desorbed products and recycling the purge gas.

The present invention provides a method of purifying a natural gas by mercaptan absorption, avoiding the drawbacks of the methods from the prior art.

SUMMARY OF THE INVENTION

The object of the present invention is thus to provide an absorption method for intensive removal of the mercaptans contained in a natural gas. The method involves a stage of absorption under pressure and at ambient or moderate temperature, a stage of desorption of the mercaptans absorbed by a displacement agent, at ambient, moderate or high temperature, the displacement agent totally or partly consisting of steam, and a displacement agent desorption and/or purge stage, at ambient, moderate or high temperature, and in a purge gas sweep stream.

In general terms, the present invention relates to a method of purifying a natural gas containing mercaptans. The method comprises the following stages:

a) contacting the natural gas with an absorbent material so as to obtain a purified gas, the mercaptans being absorbed by the absorbent material, then b) contacting the mercaptan-laden absorbent material obtained in stage a) with a stream comprising at least 50% by volume of steam so as to obtain a mercaptan-laden fluid and a water-saturated absorbent material, then c) contacting the water-saturated absorbent material obtained in stage b) with a dry gas so as to desorb the water from the absorbent material and to obtain a water-laden gas, and wherein the steam contained in the fluid obtained in stage b) is condensed and the mercaptans are separated from the condensed water.

According to the invention, prior to condensation, the fluid obtained in stage b) can be dehydrated and the dehydrated fluid can be cooled to a temperature ranging between 10° C. and −40° C.

Stage a) can be carried out at a pressure ranging between 10 bars and 100 bars, and at a temperature ranging between 0° C. and 100° C., stage b) can be carried out at a pressure ranging between 10 bars and 100 bars, and at a temperature ranging between 100° C. and 400° C., and stage c) can be carried out at a pressure ranging between 5 bars and 100 bars, and at a temperature ranging between 100° C. and 400° C.

The method according to the invention can also comprise the following stages:

d) contacting the natural gas with a second absorbent material so as to absorb the water contained in the natural gas, then e) contacting the second absorbent material with a regeneration gas.

Stage d) can be carried out at a pressure ranging between 10 bars and 100 bars, and at a temperature ranging between 0° C. and 100° C., and stage e) can be carried out at a pressure ranging between 10 bars and 100 bars, and at a temperature ranging between 100° C. and 400° C.

According to the invention, in stage b), said stream can comprise at least part of the water-laden gas obtained after contacting during stage c).

Furthermore, the non-condensed gas can be recycled in at least one of the following manners:

mixing the non-condensed gas with the natural gas prior to stage a), mixing the non-condensed gas with steam so as to form at least part of said stream.

According to the invention, the water-laden gas obtained in stage c) can be cooled to condense part of the water and the cooled gas can be recycled by mixing the cooled gas with the natural gas prior to stage a).

According to the invention, prior to stage a), said natural gas can be deacidized by absorption of the acid compounds by an absorbent solution.

Said absorbent materials can comprise at least one of the following materials: an activated charcoal, a zeolite, an activated alumina type mesoporous absorbent, and a silica gel type mesoporous adsorbent. Said absorbent materials preferably comprise at least one of the following materials: an activated charcoal having a specific surface area ranging between 500 $m^2/g$ and 2500 $m^2/g$, a type A zeolite, a type 5A zeolite, a faujasite X type zeolite, a faujasite Y type zeolite, a zeolite of the MFI family, an activated alumina type mesoporous absorbent having a BET specific surface area ranging between 150 $m^2/g$ and 800 $m^2/g$, and a silica gel type mesoporous absorbent having a BET specific surface area ranging between 150 $m^2/g$ and 800 $m^2/g$.

The present invention allows to prevent or to limit losses of purified natural gas that would be used to regenerate the mercaptan-laden absorbent. Furthermore, the stage of displacement by water of the absorbed mercaptans and heavy hydrocarbons allows to readily recover the mercaptans and the heavy hydrocarbons by simple liquid/liquid separation. Heavy hydrocarbon losses are minimized.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
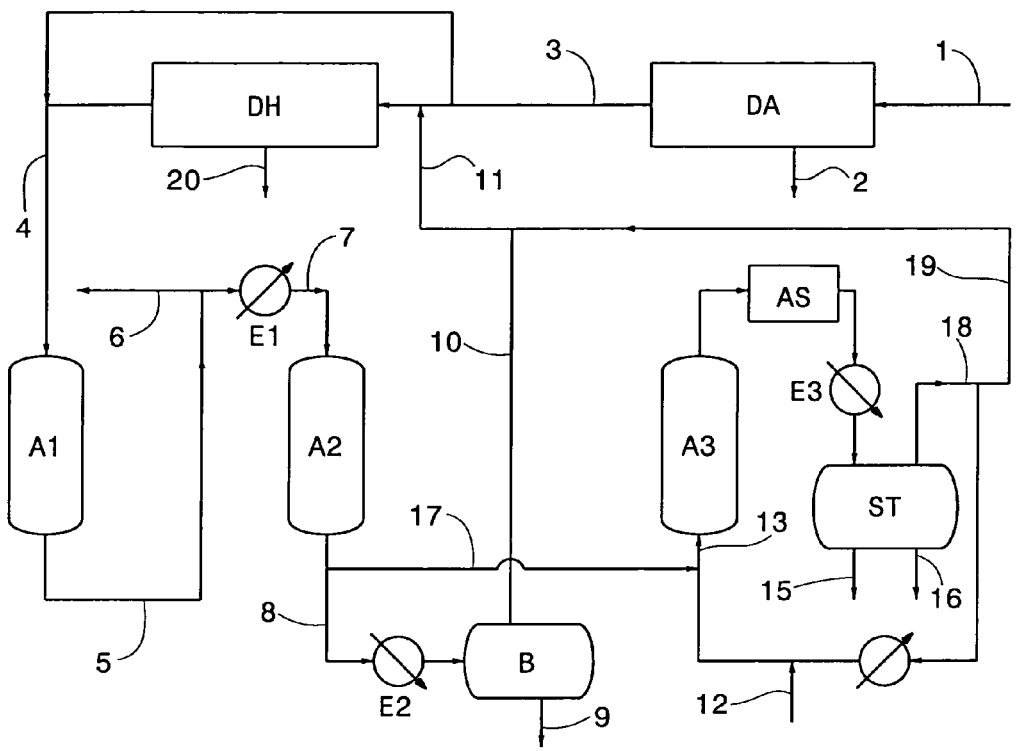
FIG. 1 describes the method according to the invention.

In FIG. 1, the natural gas to be treated flows in through line 1 and it notably contains water, $CO_2$, $H_2S$ and mercaptans. The gas can be a raw natural gas directly coming from an oil well or from a gas field. The gas can be at a pressure ranging between 60 bars and 80 bars.

The gas circulating in line 1 can be fed into deacidizing unit DA. The gas is deacidized by means of methods known to the man skilled in the art. For example, the gas is treated by means of a method using chemical and/or physical solvents, for example based on amines and/or methanol, so as to produce a natural gas meeting the $CO_2$ and $H_2S$ content requirements. Such methods are notably described by documents FR-2,605,241, FR-2,636,857, FR-2,734,083. The acid compounds $H_2S$ and $CO_2$ are discharged through line 2. Part of the mercaptans, notably the methylmercaptan, is partly removed from the gas during this treatment. These mercaptans are also discharged through line 2. The gas discharged through line 3 of unit DA has a $H_2S$ content for example of the order of 4 ppm by mole and a $CO_2$ content below 2% by mole for example. According to the temperature and pressure conditions, the water content of this gas generally ranges between 300 ppm and 5000 ppm by mole.

The deacidized gas circulating in line 3 can then be sent to dehydration unit DH. The gas is treated by means of a dehydration method, with a glycol solution for example. For instance, the dehydration method is the method described by document FR-2,740,468. The glycol used can be triethylene glycol (TEG). At the outlet of this unit DH, a dehydrated gas whose residual water content can be of the order of 60 ppm by mole is obtained. This gas still contains mercaptans and heavy hydrocarbons. The water is discharged through line 20.

The treated gas flowing from unit DH through line 4 is depleted in water and in acid compounds $CO_2$ and $H_2S$, but it still contains mercaptans, in proportions that can be above 200 ppm by mole in sulfur equivalent.

The gas circulating in line 3 can be directly transferred to line 4.

The dehydrated and deacidized gas is then sent to a purification unit using absorption on an absorbent material, for example on molecular sieves, in order to remove the mercaptans still present in this gas. This unit comprises at least two enclosures A1 and A2, and possibly a third enclosure A3, containing a suitable absorbent material allowing notably absorption of mercaptans such as methyl-, ethyl-, propyl-mercaptan, and the higher mercaptans. The absorbent material contained in enclosures A1 and A2 works successively in absorption, displacement and regeneration mode:

in absorption mode, the absorbent material absorbs the mercaptans contained in the gas, and possibly the water and the heavy hydrocarbons, at ambient or moderate temperature and under high pressure, then in displacement mode, displacement of the mercaptans and possibly of the heavy hydrocarbons absorbed in the absorption mode is carried out; the mercaptans and possibly the heavy hydrocarbons are displaced by steam, i.e. desorbed and replaced by water, displacement being performed by a sweep stream of steam or of a steam-rich gas, at moderate or high temperature, under moderate or low pressure, then in regeneration mode or, in other words, in drying mode, after displacement, desorption of the water absorbed by the absorbent material and purge of the intergrain volumes is carried out by a sweep stream of a dry gas at high temperature, then an absorbent material cooling stage can be carried out, the cycle then starts again in the mercaptan absorption mode.

In FIG. 1, the absorbent material contained in enclosure A1 works in absorption mode, the material contained in enclosure A2 works in regeneration mode and the material contained in enclosure A3 works in displacement mode.

The dehydrated and deacidized gas circulating in line 4 is fed into enclosure A1. The mercaptans contained in the gas are absorbed by the absorbent material contained in enclosure A1.

The mercaptans and possibly the heavy hydrocarbons, notably $C_6^+$, are absorbed in the central zone of enclosure A1. A purified gas meeting the specifications relative to acid gas, total sulfur and water contents is obtained at the outlet of enclosure A1. The purified gas is discharged from enclosure A1 through line 5.

The purified gas is obtained as long as the cycle time is less than the mercaptan breakthrough time, i.e. absorption is carried out in enclosure A1 for example until the material is saturated with mercaptans. The operating mode of the material of enclosure A1 is then replaced by that of another enclosure, for example enclosure A2 whose absorbent material is regenerated, i.e. it comprises no or few absorbed mercaptans and water.

The temperature inside enclosure A1 working in absorption mode generally ranges between 0° C. and 100° C., advantageously between 15° C. and 80° C., preferably between 15° C. and 40° C. The pressure in enclosure A1 can be the pressure of the natural gas produced, typically ranging between 10 bars and 100 bars, preferably between 30 bars and 80 bars.

The surface velocity of the gas in enclosure A1 ranges for example between 0.5 and 30 m/min.

The purified gas is for example sent through line 6 into a fractionating unit in order to upgrade the various cuts, by distillation for example. It is possible to separate the purified gas to obtain methane, ethane, propane, butane and a heavy hydrocarbon cut containing more than five carbon atoms. The purified gas can also be sent through line 6 to a place where it is stored or used.

In enclosure A2, the absorbent material is laden with water. According to the invention, a dry gas, i.e. a gas comprising less than 5 ppm volume of water and possibly less than 20 ppm volume of mercaptans, is used as regeneration gas to regenerate the material contained in enclosure A2, i.e. to discharge the water contained in the material in enclosure A2. Regeneration is carried out in TSA mode. The dry gas can be part of the purified gas from enclosure A1, or any other gas comprising for example saturated hydrocarbons, nitrogen, $CO_2$ or hydrogen. This regeneration stage allows to purge the intergrain volume and the macro-, meso- and micro-porous volumes of the absorbent containing water, then to bring the temperature of the absorbent material down again. This operation is preferably carried out at high temperature so as to desorb and to discharge the water from enclosure A2. The regeneration stage is performed under temperature and pressure conditions close or equal to those used during the displacement stage described hereafter.

Part of the purified gas from enclosure A1 is heated in heat exchanger E1 to a temperature ranging between 100° C. and 400° C., preferably between 200° C. and 350° C., then fed through line 7 into enclosure A2. The flow of gas fed into enclosure A2 can range between 1% and 50%, preferably between 1% and 20% of the total flow of purified gas from enclosure A1. In enclosure A2, the pressure generally ranges between 5 bars and 100 bars, preferably between 10 bars and 70 bars, the temperature can range between 100° C. and 400° C., preferably between 200° C. and 350° C.

Once the water discharged from the absorbent material of enclosure A2, the temperature in enclosure A2 is progressively lowered down to the temperature used for absorption in enclosure A1. For example, gas coming from enclosure A1 is fed into enclosure A2 through line 7, and this gas is not heated by exchanger E1. This operation can be carried out under the same pressure as the absorption operation. The gas obtained at the outlet of enclosure A2 can be recycled upstream from enclosure A1, for example mixed with the gas circulating in line 4. This operation can also be carried out under a lower pressure, for example ranging between 1 bar and 30 bars, preferably between 1 bar and 10 bars, so as to limit the amount of purge gas used.

At the outlet of enclosure A2, the purified gas circulating in line 8 is laden with water from the desorption of the absorbed water. The gas can be cooled in heat exchanger E2 to a temperature ranging between 15° C. and 150° C., preferably between 15° C. and 80° C. Cooling allows to condense part of the water contained in the gas. The cooled gas is fed into gas/liquid separator B in order to recover part of the water condensed by cooling.

The operating conditions of separator B are so selected as to prevent any formation of natural gas hydrates in the separator. The operating conditions of separator B are a temperature ranging between 15° C. and 150° C., preferably between 15° C. and 80° C., and a pressure ranging between 1 bar and 100 bars, preferably between 5 bars and 70 bars. The condensed water is discharged from B through line 9, the gas is discharged from B through line 10.

Part or all of the gas discharged from B can be recycled. For example, this gas is compressed, sent through lines 10 and 11 to be mixed with the gas circulating in line 3, then fed into dehydration unit DH.

If separator B works under low pressure, the gas can be used as fuel gas, for example for the process utilities.

The absorbent material contained in enclosure A3 is laden with mercaptans. The material can also be laden, in addition to the mercaptans, with water and/or heavy hydrocarbons, notably of $C_6^+$ type. This material has to be at least partly freed of the mercaptans in order to take part in a new absorption cycle. According to the invention, the mercaptans are displaced by steam, pure or diluted, for example by part of the drying gas from enclosure A2. The steam flowing in through line 12 is fed through line 13 into enclosure A3.

The amount of water required for the stage of displacement of the mercaptans and of the heavy hydrocarbons absorbed on the absorbent in enclosure A3 notably depends on the desired degree of regeneration, i.e. the dynamic capacity and the residual capacity after regeneration of the absorbent material in relation to the mercaptans, the temperature and the pressure of this displacement stage. The amount of water required is all the lower as the temperature is high, the total pressure low, the absorbent regeneration degree low and the residual capacity after regeneration high.

At the end of this displacement stage, the intergrain volume of the absorbent material of enclosure A3 and the pore volumes of the absorbent are filled with steam. This absorbed water or steam has to be eliminated by drying the absorbent at high temperature in a gas sweep stream.

If the absorbent material used for removing the mercaptans is of hydrophobic nature, for example an activated charcoal or a partly dealuminated zeolite whose Si/Al molar ratio is above 5, the amount of water to be used can range between 0.1 and 50 times the mass of absorbent contained in enclosure A3, preferably between 0.5 and 10 times, and more preferably between 0.5 and 5 times. The mass of water to be used is all the smaller as the temperature is high and the pressure is low.

On the other hand, if the absorbent material is of hydrophilic or partly hydrophilic nature, for example a zeolite whose Si/Al molar ratio is below 5, the amount of water to be used preferably ranges between 1 and 100 times the amount of absorbed mercaptans and heavy hydrocarbons to be displaced, and advantageously between 1 and 20 times this amount. In this case, the water is likely to be absorbed instead of the absorbed mercaptans, which facilitates their desorption.

Prior to displacing the mercaptans with a steam stream, a stage of preheating the absorbent material used to remove the mercaptans contained in enclosure A3 can be carried out before introduction of the steam or of the steam-rich gas, at high temperature. This stage can be important for preventing condensation of the steam in the part of the absorber that might not be at a sufficiently high temperature yet. It also allows to limit possible exothermicity phenomena following the absorption of a large amount of water in a short time interval. Preheating can be carried out by sending into enclosure A3 a gas flowing from enclosure A2 through line 17.

The operating conditions in enclosure A3 are a temperature ranging between 50° C. and 400° C., preferably between 50° C. and 200° C. The pressure must be selected lower than the vapor pressure of the water at the temperature considered so as to prevent any appearance of liquid water in the absorber during the displacement stage. When pure steam is used, the pressure ranges between 1 and 150 bars, preferably between 1 and 100 bars, more preferably between 1 and 50 bars and most preferably between 1 and 10 bars. When the steam is diluted by natural gas consisting for example of all or part of the natural gas obtained at the outlet of the absorber(s) in the stage of drying the absorbent used for removing the mercaptans or regeneration of the dehydration absorbent, the pressure ranges between 1 and 100 bars, preferably between 1 and 50 bars and more preferably between 1 and 5 bars.

If the steam is diluted with natural gas, the proportion of steam according to the invention is above 50% by volume of the mixture and preferably above 80%. According to a preferred embodiment of the invention, it is above 95% by volume.

The gaseous mixture obtained at the outlet of enclosure A3, essentially consisting of mercaptans and heavy hydrocarbon compounds, mixed with the steam, is cooled in heat exchanger E3. In exchanger E3, the gaseous mixture is cooled to a steam condensation temperature, for example a temperature ranging between 5° C. and 100° C., preferably between 10° C. and 40° C. It is then sent to a three-phase separator ST allowing to recover a liquid hydrocarbon fraction containing most of the dissolved mercaptans, an aqueous phase that can be recycled or not, and possibly a gas phase, notably if the steam was diluted in a gas. The gas phase recovered in separator ST can then be recycled either upstream from dehydration unit DH or upstream from the dehydration unit using molecular sieves.

When pure steam flows through enclosure A3, the operating conditions of separator ST are a temperature ranging between 5° C. and 100° C., preferably between 10° C. and 40° C., and a pressure ranging between 1 and 150 bars, preferably between 1 and 100 bars, more preferably between 1 and 50 bars and most preferably between 1 and 10 bars. If a gas fraction is used as the diluent for the steam, the operating conditions of separator ST, i.e. the temperature and the pressure, are so selected as to prevent the formation of natural gas hydrates. The natural gas hydrate formation temperature can be calculated according to the composition of the gas and to the pressure according to rules known to the man skilled in the art.

At the outlet of separator ST, a liquid hydrocarbon fraction notably consisting of the mercaptans, the heavy hydrocarbons and possibly light hydrocarbons of the natural gas, dissolved, is recovered through line 15. This liquid hydrocarbon fraction can be expanded to a pressure close to the atmospheric pressure, then the mercaptans can be removed for example by means of an absorption method using a solution comprising soda or potash. The purified liquid hydrocarbon fraction thus obtained can then be upgraded.

The liquid aqueous phase recovered at the outlet of separator ST through line 16 essentially consists of water, but it can also contain heavy hydrocarbon compounds and dissolved light hydrocarbons as traces. These compounds can be removed for example by stripping, i.e. by steaming. The steam produced can be recycled through line 12 for displacement of the mercaptans in enclosure A3.

The steam flowing in through line 12 can be diluted by a natural gas fraction, for example all or part of the gas recovered through line 17 at the outlet of enclosure A2 in the absorbent material drying stage. This natural gas is not condensed by cooling in exchanger E3. A gas fraction essentially comprising natural gas, with traces of light mercaptans and hydrocarbons, is then recovered in three-phase separator ST. This gas is discharged from separator ST through line 18. It can be advantageously recycled upstream from dehydration unit DH through lines 19 and 11 to be mixed with the gas circulating in line 3. It can also be mixed with the steam flowing in through line 12 to dilute this steam.

In order to raise the condensation rate of the mercaptans in three-phase separator ST, and thus to decrease the proportion of mercaptans contained in the gas recycled through line 18, a stage of dehydration of the gas leaving enclosure 3 can be carried out between the outlet of enclosure A3 and the inlet of separator ST so as to allow this separator ST to work at a lower temperature without any risk of gas hydrate formation. Dehydration of this gas can be carried out in unit AS, for example by means of a glycol dehydration method (for example described with reference to unit DH), or by means of a TSA type absorption on a 3A or 4A type zeolite, according to rules known to the man skilled in the art. Thus, according to the invention, the cooling temperature in E3 and the operating temperature of separator TS can range between 10° C. and −40° C., preferably between 0° C. and −40° C., more preferably between −20° C. and −40° C. These operating temperatures allow to achieve higher condensation of the desorbed mercaptans from enclosure A3 that will be discharged from the separator through line 15 with the liquid hydrocarbon phase.

The velocity of flow of the steam in enclosure A3 ranges between 0.5 and 50 m/min, preferably between 0.5 and 30 m/min.

According to the method described in connection with FIG. 1, enclosures A1, A2 and A3 work alternately in absorption mode (absorption of the mercaptans contained in the gas to be treated), then in displacement mode (displacement of the absorbed mercaptans by water), then in regeneration mode (desorption of the water).

After a predetermined time, the operating mode of the material of enclosure A1 is replaced by that of enclosure A3, the mode of enclosure A2 is replaced by that of enclosure A1, and the mode of enclosure A3 is replaced by that of enclosure A2. The change can be performed when the material contained in the enclosure working in regeneration mode is sufficiently regenerated to work in absorption mode. The change can also be performed when the material contained in the enclosure working in absorption mode is too mercaptan-laden to be still able to provide purification of the gas to be treated.

Alternatively, the method described in connection with FIG. 1 can work with two different amounts of absorbent material. While a first amount of absorbent material undergoes the absorption stage in enclosure A1, the other amount of absorbent material successively undergoes the steam displacement stage in enclosure A3, then the regeneration or drying stage in enclosure A2. Then the roles of the two absorbents are reversed.

The length of the various stages typically ranges between 1 and 24 hours, preferably between 1 and 18 hours, more preferably between 1 and 12 hours.

Figure 2:
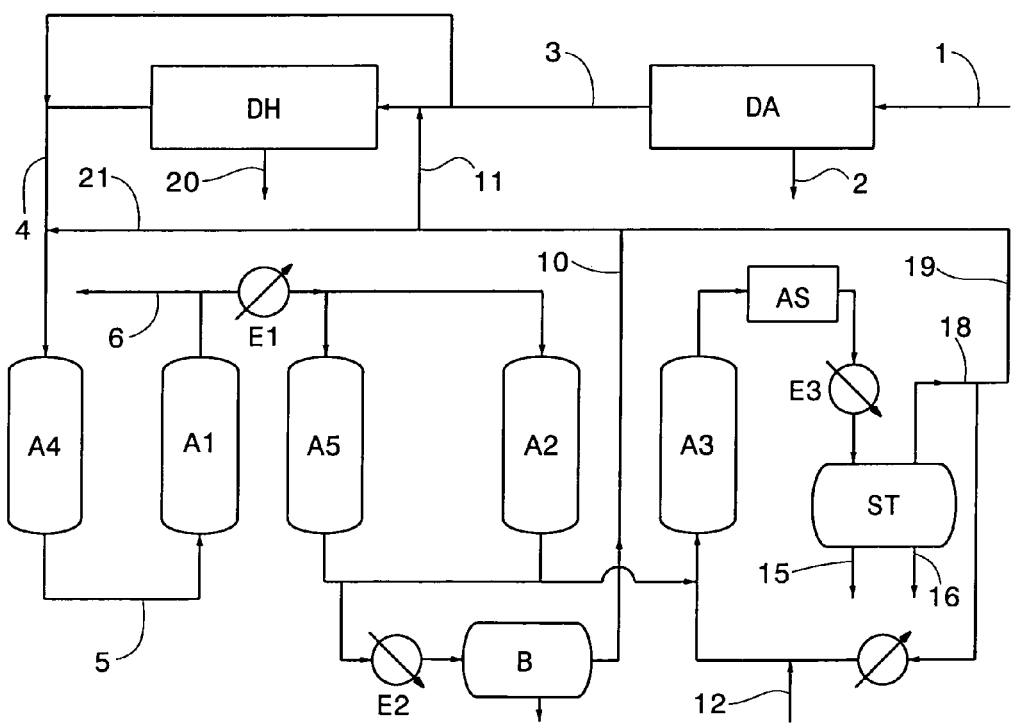
FIG. 2 shows a variant of the method according to the invention.

The method described in connection with FIG. 2 is an improvement of the method described in connection with FIG. 1. The reference numbers of FIG. 2 identical to those of FIG. 1 designate the same elements.

The raw natural gas flowing in through line 1 is possibly deacidized in unit DA, then possibly dehydrated in unit DH.

The deacidized and dehydrated natural gas is fed into a purification unit. This unit comprises at least five enclosures A1, A2, A3, A4 and A5 working in parallel:
- a first enclosure works in absorption mode, notably for the residual water present in the gas after deacidizing and dehydration, absorption being carried out at ambient or moderate temperature,
- a second enclosure works in absorption mode, notably for the mercaptans and the heavy hydrocarbons present in the gas from the first enclosure, absorption being carried out at ambient or moderate temperature,
- the third and fourth enclosures work in regeneration mode, i.e. desorption of the water by sweeping with a gas at high temperature,
- a fifth enclosure works in displacement mode, notably for the absorbed mercaptans and hydrocarbons, by sweeping with steam, the gas being at ambient or moderate temperature.

In FIG. 2, the material contained in enclosure A4 works in water absorption mode, the material contained in enclosure A1 works in mercaptan absorption mode, the material contained in enclosures A2 and A5 works in regeneration mode, and the material contained in enclosure A3 works in displacement mode.

If the absorbent material used to remove the mercaptans in enclosure A1 is hydrophobic, enclosures A1 and A4 can be inverted. The gas circulating in line 3 first flows through enclosure A1, then through enclosure A4. In this configuration, the water possibly still present in enclosure A1 after the drying regeneration stage can be absorbed by the material contained in enclosure A4.

The operating pressure in enclosures A1 and A4 generally ranges between 10 and 100 bars, preferably between 30 and 80 bars, and the temperature ranges between the ambient temperature and 100° C., preferably between 40° C. and 70° C. Dimensioning of enclosures A1 and A4 can be done considering the total amount of mercaptans and of heavy hydrocarbon compounds to be absorbed in enclosure A1. The residual water content in the gas can be adjusted so as to saturate absorber A4 during the same cycle time as absorber A1.

A purified natural gas meeting the acid gas, total sulfur and water dew point specifications is obtained at the outlet of enclosure A4 and discharged through line 6.

The purified gas is then possibly sent through line 6 to a fractionating unit in order to upgrade the various cuts.

According to the invention, a dry gas, i.e. a gas comprising less than 5 ppm volume of water and possibly less than 20 ppm volume of mercaptans, is used as regeneration gas for regenerating the material contained in enclosures A2 and A5, i.e. for discharging the water contained by the material in enclosures A2 and A5. Regeneration is carried out in TSA mode. The dry gas can be part of the purified gas from enclosure A1, or any other gas for example comprising saturated hydrocarbons, nitrogen, $CO_2$ or hydrogen. For example, part of the purified gas, generally between 1 and 50% by volume in relation to the total gas, preferably between 2 and 30% by volume, is used as purge gas for regenerating in TSA mode the absorbent materials of enclosures A2 and A5. This gas part is heated in exchanger E1, then sent to enclosures A2 and A5. The pressure in enclosures A2 and A5 generally ranges between 1 and 100 bars, preferably between 10 and 80 bars, the temperature ranges between 100° C. and 400° C., preferably between 200° C. and 350° C.

At the outlet of enclosures A2 and A5, the purified gas is laden with water from the desorption of the water absorbed in the enclosures.

All or part of the wet gas from enclosures A2 and A5 is cooled and a gas/liquid separator B allows to recover part of the condensed water. The operating conditions in this separator B are a temperature ranging between 10° C. and 150° C., preferably between 15° C. and 80° C., a pressure ranging between 1 and 100 bars, preferably between 2 and 70 bars. The operating conditions are so selected as to prevent any natural gas hydrate formation in the separator. At the outlet of this separator, the gas still laden with residual water can be sent upstream for example from dehydration unit DH through lines 10 and 11, or upstream from enclosures A4 and A1 through lines 10 and 21.

If enclosures A2 and A5 work with two different pressure levels, two separators can be used to condense the water at the outlet of enclosures A2 and A5, one being connected to enclosure A2 and the other to enclosure A5.

The absorbent material used to remove the mercaptans contained in enclosure A3 is saturated, at the end of the cycle, with the mercaptans and the heavy hydrocarbons present in the gas, and it has to be at least partly regenerated so as to be used again in an absorption cycle. According to the invention, this regeneration is carried out using as the fluid notably steam, pure or diluted, for example by all or part of the gas used to dry the absorbent contained in enclosures A2 or A5, at high temperature, for example typically ranging between 100° C. and 450° C., preferably between 100° C. and 350° C. The pressure for this operation has to be lower than the vapor pressure of the water at the temperature considered, it typically ranges between 1 and 40 bars, preferably between 1 and 20 bars and more preferably between 1 and 10 bars.

At the outlet of enclosure A3, the steam contains desorbed mercaptans and heavy hydrocarbons. A three-phase water/hydrocarbon/gas separator ST notably allows to recover the liquid water on the one hand and a liquid hydrocarbon fraction notably consisting of the heavy hydrocarbons and the mercaptans on the other hand. The operating conditions of this separator ST are a temperature ranging between 10° C. and 100° C., preferably between 10C and 40° C., and a pressure ranging between 1 and 40 bars, preferably between 1 and 20 bars, more preferably between 1 and 10 bars. At the end of this displacement stage, the intergrain volume of the absorber and the pore volumes of the absorbent used to remove the mercaptans are filled with steam. This steam or absorbed water has to be eliminated by drying the absorbent at high temperature in a gas sweep stream. This is achieved as described above in the stage relative to the operation of enclosure A2.

The length of each one of these sequences typically ranges between 1 and 24 hours, preferably between 1 and 18 hours, more preferably between 1 and 12 hours. Dimensioning of the absorbers is performed according to rules known to the man skilled in the art. The surface velocity of the steam in the absorber ranges for example between 0.5 and 30 m/min.

According to the invention, the absorbent materials used for absorption of the mercaptans in enclosures A1, A2 and A3 can be of hydrophilic or hydrophobic nature. The absorbent materials used for dehydration of the natural gas in enclosures A4 and A5 are of hydrophilic nature.

The hydrophobic absorbent materials are preferably selected from among activated charcoals, of hydrophobic nature, notably those whose specific surface area typically ranges between 500 and 2500 $m^2/g$, as well as zeolites, or molecular sieves, notably of type Y, of the faujasite family, whose Si/Al molar ratio is above 3, preferably above 5. It is also possible to select zeolites of the MFI family, notably ZSM-5 zeolites, partly or totally dealuminated, such as silicalite. The compensation cation preferably is sodium. These absorbents are known to the man skilled in the art as NaY.

The hydrophilic absorbent materials possibly used to remove the mercaptans from the natural gas in enclosures A4 and A5 are preferably selected from the LTA type molecular sieves, also referred to as zeolites, or the mesoporous absorbents of activated alumina or silica gel type.

The hydrophilic absorbent materials used to remove the mercaptans from the natural gas are preferably selected from among the 5A, X or Y zeolites.

Among the hydrophilic zeolites, it is possible to choose among the type A zeolites (LTA family), notably the zeolites selective towards water, and notably 3A and 4A type zeolites, whose pore diameter is smaller than 0.4 nm. It is also possible to use zeolites of type 5A, or of type X or Y such as NaX or NaY zeolites (FAU faujasite family), whose Si/Al molar ratio is preferably below 3. The other absorbents that can be used for this application can be selected from among the activated aluminas or silica gels, preferably those having a BET specific surface area, conventionally determined by physisorption of nitrogen at 77 K, ranging between 150 and 800 $m^2/g$.

The absorbent materials are preferably used in fixed beds, for example in form of balls or extruded material. They can be used either alone or in admixture, for example in form of multibeds. In the case of multibeds, the activated aluminas or silica gels are used upstream from the molecular sieves.

The invention claimed is:

1. A method of purifying a natural gas containing mercaptans, comprising the following stages:
   a) contacting the natural gas with an adsorbent material so as to obtain a purified gas, the mercaptans being adsorbed by the adsorbent material, then
   b) contacting the mercaptan-laden adsorbent material obtained in stage a) with a stream comprising at least 50% by volume of steam so as to obtain a mercaptan-laden fluid and a water-saturated adsorbent material, then
   c) contacting the water-saturated adsorbent material obtained in stage b) with a dry gas so as to desorb the water from the adsorbent material and to obtain a water-laden gas, and wherein the steam contained in the fluid obtained in stage b) is condensed and the mercaptans are separated from the condensed water.

2. A method as claimed in claim 1 wherein, prior to condensation, the fluid obtained in stage b) is dehydrated and the dehydrated fluid is cooled to a temperature ranging between 10° C. and −40° C.

3. A method as claimed in claim 1, wherein:
   stage a) is carried out at a pressure ranging between 10 bars and 100 bars, and at a temperature ranging between 0° C. and 100° C.,
   stage b) is carried out at a pressure ranging between 10 bars and 100 bars, and at a temperature ranging between 100° C. and 400° C.,
   stage c) is carried out at a pressure ranging between 5 bars and 100 bars, and at a temperature ranging between 100° C. and 400° C.

4. A method as claimed in claim 1, wherein the following stages are also carried out:
   d) contacting the natural gas with a second adsorbent material so as to adsorb the water contained in the natural gas, then
   e) contacting the second adsorbent material with a regeneration gas.

5. A method as claimed in claim 4, wherein:
   stage d) is carried out at a pressure ranging between 10 bars and 100 bars, and at a temperature ranging between 0° C. and 100° C.,
   stage e) is carried out at a pressure ranging between 10 bars and 100 bars, and at a temperature ranging between 100° C. and 400° C.

6. A method as claimed in claim 1, wherein, in stage b), said stream comprises at least part of the water-laden gas obtained after contacting in stage c).

7. A method as claimed in claim 1, wherein the non-condensed gas is recycled according to at least one of the following manners:
   mixing the non-condensed gas with the natural gas prior to stage a),
   mixing the non-condensed gas with steam so as to form at least part of said stream.

8. A method as claimed in claim 1, wherein the water-laden gas obtained in stage c) is cooled to condense part of the water and the cooled gas is recycled by mixing the cooled gas with the natural gas prior to stage a).

9. A method as claimed in claim 1, wherein, prior to stage a), said natural gas is deacidized by absorption of the acid compounds by an absorbent solution.

10. A method as claimed in claim 1, wherein said adsorbent materials comprise at least one of the following materials: an activated charcoal, a zeolite, an activated alumina type mesoporous adsorbent, and a silica gel type mesoporous adsorbent.

11. A method as claimed in claim 1, wherein said adsorbent materials comprise at least one of the following materials: an activated charcoal having a specific surface area ranging between 500 and 2500 $m^2/g$, a type A zeolite, a type 5A zeolite, a faujasite X type zeolite, a faujasite Y type zeolite, a zeolite of the MFI family, an activated alumina type mesoporous adsorbent having a BET specific surface area ranging between 150 $m^2/g$ and 800 $m^2/g$, and a silica gel type mesoporous adsorbent having a BET specific surface area ranging between 150 $m^2/g$ and 800 $m^2/g$.

* * * * *